US012412039B2

United States Patent
Mehta et al.

(10) Patent No.: US 12,412,039 B2
(45) Date of Patent: Sep. 9, 2025

(54) NATURAL LANGUAGE UNDERSTANDING FOR CREATING AUTOMATION RULES FOR PROCESSING COMMUNICATIONS

(71) Applicant: Microsoft Technology Licensing, LLC, Redmond, WA (US)

(72) Inventors: Kuleen Mehta, Sammamish, WA (US); Matheus Camasmie Pavan, Sao Paulo (BR); Alan Thomas, Woodstock, GA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 501 days.

(21) Appl. No.: 17/849,228

(22) Filed: Jun. 24, 2022

(65) Prior Publication Data
US 2023/0419041 A1    Dec. 28, 2023

(51) Int. Cl.
*G06F 40/30* (2020.01)
*G06F 16/3329* (2025.01)
*G06F 16/334* (2025.01)
*G06F 40/55* (2020.01)

(52) U.S. Cl.
CPC .......... *G06F 40/30* (2020.01); *G06F 16/3329* (2019.01); *G06F 16/3344* (2019.01); *G06F 40/55* (2020.01)

(58) Field of Classification Search
CPC ............... G06F 16/3329; G06F 16/332; G06F 16/3344; G06F 16/33; G06F 40/55; G06F 40/279; G06Q 10/107
See application file for complete search history.

(56) References Cited

U.S. PATENT DOCUMENTS

| 5,917,489 A | 6/1999 | Goodhand et al. |
| 9,495,129 B2 | 11/2016 | Fleizach et al. |
| 10,068,008 B2 | 9/2018 | Udupa et al. |
| 2004/0088359 A1 | 5/2004 | Simpson |
| 2007/0174350 A1 | 7/2007 | Pell et al. |

(Continued)

OTHER PUBLICATIONS

"Natural Language Search in Outlook", Retrieved from: https://support.microsoft.com/en-us/office/natural-language-search-in-outlook-0c819cb0-980c-47c3-8e67-5c4fec6b6b87, May 5, 2021, 4 Pages.

(Continued)

*Primary Examiner* — Huyen X Vo

(57) ABSTRACT

Methods and systems for generating automation rules based on natural language inputs. In an example, the technology relates to a computer-implemented method for generating automation rules from natural language input. The method includes receiving a natural language input into a communications application for performing an action on communications received by the communications application; providing the natural language input into a trained machine learning model; receiving, as output from the trained machine learning model, a tagged primitive and an identified action from the natural language input; generating an automation rule for performing the action on a subset of communications received by the communications application, the subset of communications corresponding to the tagged primitives; and executing the generated automation rule to perform action on the subset of communications.

15 Claims, 9 Drawing Sheets

(56) References Cited

U.S. PATENT DOCUMENTS

| | | |
|---|---|---|
| 2012/0290662 A1 | 11/2012 | Weber et al. |
| 2015/0281155 A1 | 10/2015 | Cue et al. |
| 2016/0188599 A1 | 6/2016 | Maarek et al. |
| 2018/0233141 A1* | 8/2018 | Solomon .............. H04N 23/611 |
| 2018/0260445 A1 | 9/2018 | Aravamudan et al. |
| 2019/0042561 A1* | 2/2019 | Kakirwar .............. G06F 40/295 |
| 2020/0380389 A1 | 12/2020 | Eldeeb et al. |
| 2021/0034821 A1* | 2/2021 | Choi ....................... G10L 15/22 |

OTHER PUBLICATIONS

"Search for Emails in Mail on Mac", Retrieved from: https://support.apple.com/en-gb/guide/mail/mlhlp1003/mac, Mar. 29, 2022, 3 Pages.
"International Search Report and Written Opinion Issued in PCT Application No. PCT/US23/021617", Mailed Date: Sep. 1, 2023, 11 Pages.

\* cited by examiner

NATURAL LANGUAGE UNDERSTANDING FOR CREATING AUTOMATION RULES FOR PROCESSING COMMUNICATIONS

BACKGROUND

Modern communication applications, such as email applications, chat applications, and the like, have become standard platforms for electronic communications. With the ease provided by such electronic communication applications, however, the number of communications that are received by each user has quickly grown by a significant amount, with some users receiving hundreds if not thousands of communications in a given day or week.

It is with respect to these and other considerations that examples have been made. In addition, although relatively specific problems have been discussed, it should be understood that the examples should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

The present technology improves the machine-human interface and reduces waste of computing resources by utilizing machine-learning techniques to process natural language inputs from the user to generate and execute automation rules. By having a system that capable of processing the natural language input, the user is able to express his or her direct intent for what action(s) should be performed on the communications. The machine learning model is able to convert the received natural language inputs into an appropriate representation of data that can be used by the communication application to generate automation rules or workflows for acting on the communications. Thus, the machine-human interface is improved in a manner that improves the ease of use of generating automation rules while also improving the accuracy of the rules and workflows that are generated.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various aspects of the present invention. In the drawings.

DETAILED DESCRIPTION

Figure 1:
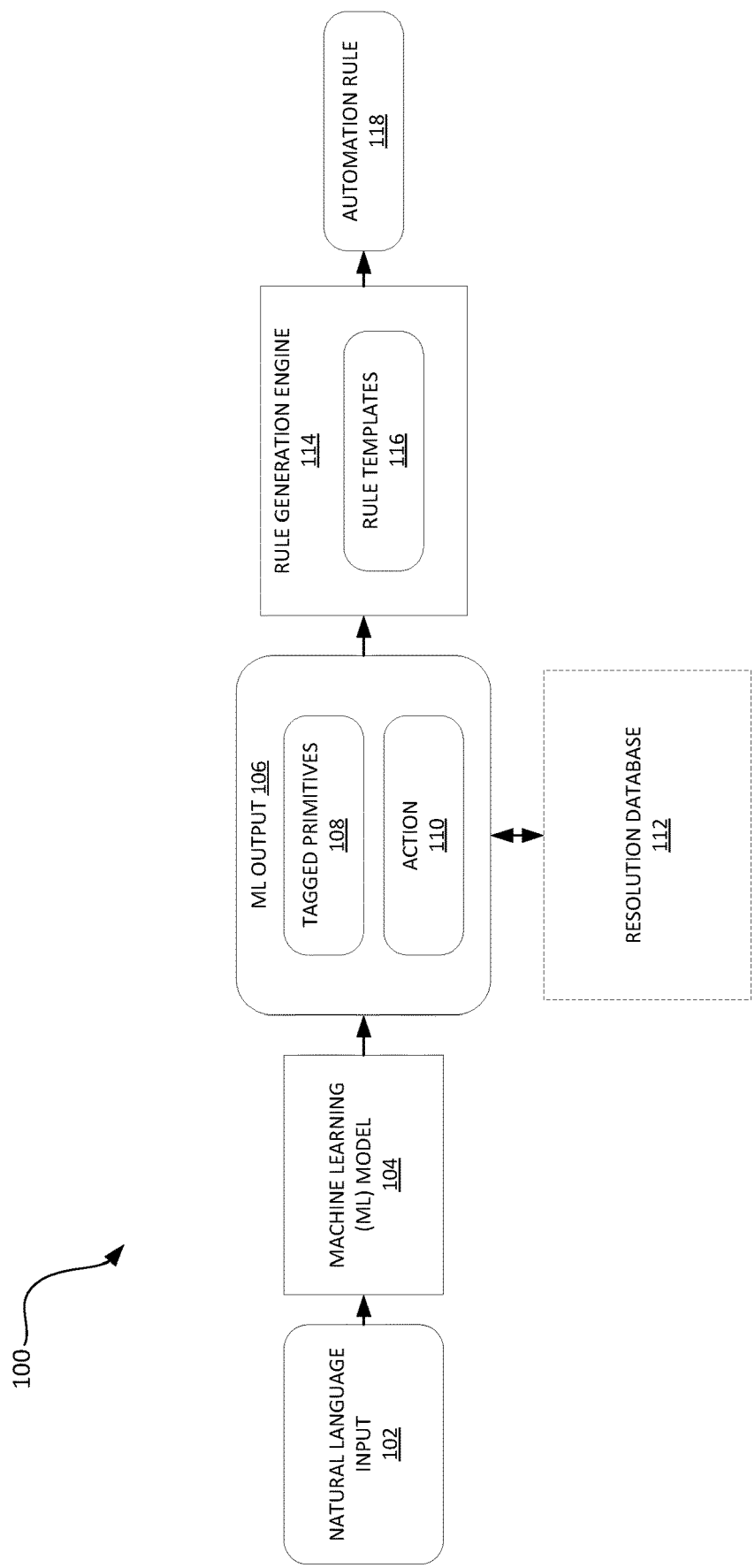
FIG. 1 depicts an example system and process flow for generating automation rules from natural language input.

The following detailed description refers to the accompanying drawings. Wherever possible, the same reference numbers are used in the drawing and the following description to refer to the same or similar elements. While aspects of the technology may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the technology, but instead, the proper scope of the technology is defined by the appended claims. Examples may take the form of a hardware implementation, or an entirely software implementation, or an implementation combining software and hardware aspects. The following detailed description is, therefore, not to be taken in a limiting sense.

As discussed briefly above, electronic communications such as emails, text messages, chat messages, and the like have become the prevalent form of communication in modern day society. Technology has provided for an ease of sending and receiving these communications, which has caused users to receive hundreds to thousands of communications every day or week. This onslaught of communications raises significant technology problems on how to electronically store, present, and process these communications in a manner that is computationally efficient while maintaining a human-machine interface that allows for the user to interact with the communications in a meaningful way.

One way that has been introduced to process these communications is to create rules within the communications application, such as rules available in some email applications. The schemas and syntax for these rule-generating features, however, are quite limited, and a user's intent in creating the rule gets lost in the cumbersome settings processes involved. As a result, erroneous results often occur and many rounds of trial and error are required by the user to configure the rule to reach the intended results. This trial and error process needlessly consumes computing resources and also may result in lost or erroneously processed emails or communications.

The present technology improves the machine-human interface and reduces waste of computing resources by utilizing machine-learning techniques to process natural language inputs from the user. By processing a natural language input, the user is able to express his or her direct intent for what action(s) should be performed on the communications. The machine learning model is able to convert the received natural language inputs into an appropriate representation of data that can be used by the communication application to generate automation rules or workflows for acting on the communications. Thus, the machine-human interface is improved in a manner that improves the ease of use of generating automation rules while also improving the accuracy of the rules and workflows that are generated.

More specifically, the present technology receives a natural language input from a user. The natural language input is then provided to a trained machine learning model that processes the natural language input to generate a machine learning output. The machine learning output includes one or more tagged primitives and one or more actions. The tagged primitives may be made up of two parts: (1) a primitive tag, and (2) a value from the natural language input. The tags of the tagged primitives may include elements that may be used to filter communications, such as a to tag or a from tag that correspond to a to or from field of the respective communications. The action(s) in the machine learning output may include various actions that may be performed on communications, such as a move action, a flag action, a mark-as-read action, etc.

In some examples, the values of the tagged primitives or actions require further resolution or disambiguation, such as when the values are specific to the user. For instance, a value for a tagged primitive may be "my manager." Such a value cannot be used for filtering communications without further information about the identity of "my manager." Upon detecting such user-specific terms or other terms that require further resolution, the present technology may query a remote database, which may include knowledge graphs or like related to the user, to resolve the identities or other details of the user-specific terms. Thus, additional features of natural language inputs may be handled by the present technology without requiring manual resolution or additional data from the user.

Once the tagged primitives and actions in the machine learning output have been received, and further resolved where necessary, an automation rule is generated from the values of the tagged primitives and actions. The automation rule may be stored as a recurrent rule or be executed immediately. Execution of the automation rule may include filtering a set of communications based on the tagged primitives to form a filtered subset of communications. The action is then performed on the filtered subset of communications.

FIG. 1 depicts an example system 100 and process flow for generating automation rules from natural language input. As an initial operation, the system 100 receives a natural language input 102. The natural language input 102 may be an unstructured input that is provided in a manner that humans normally, or naturally, speak or write. The natural language input may be received in a variety of different forms. For instance, the natural language input may be received as text input that is entered via a keyboard or other manual input mechanism. In other examples, the natural language input 102 may be received via voice input, and the audio corresponding to the voice input is converted to text via a speech-to-text conversion. The text output of the speech-to-text conversion may then be used as the natural language input 102.

The natural language input 102 is received by a communications application, such as a mail application, messaging application, collaboration application, or the like. The communications application may be a local application that is executing on a local device, such as the device of a user providing the natural language input 102. For instance, the communications application may be a desktop application or app on a smartphone or similar device. In other examples, the communications application may be a web-based application that is executing in a cloud-based environment (e.g., on a remote server) and is accessible via the Internet, such as through the use of web browser.

The natural language input 102 is provided as input to a trained machine learning (ML) model 104. The ML model 104 has been trained to process or understand the natural language input 102 that is provided as input to the ML model 104. Training of the ML model 104 is discussed further below with reference to FIG. 4C. In some examples, the ML model 104 is a neural network, such as a convolutional neural network. The ML model 104 may be a ML model that is specifically designed for handling of natural language. For example, the base of the ML model may be the Generative Pre-Trained Transformer 3 (GPT-3) autoregressive language model. Other potential models, however, may also be implemented and used with the present technology once trained to recognize the natural language input 102 and generate the ML outputs discussed herein.

The ML model 104 processes the natural language input 102 to generate an ML output 106. The ML output 106 that is generated from the ML model 104 includes one or more tagged primitives 108 and at least one action 110. The tagged primitives 108 are made of two parts: (1) a primitive tag, and (2) a value from the natural language input 102. The tags of the tagged primitives 108 may include elements that may be used to filter communications based on one or more fields or properties of the communications. For example, the primitive tags may include one or more of the following: a to tag, a from tag, a cc tag, a bcc tag, an invite tag, an update tag, a read tag, a flag tag, a date-span tag, a folder tag, and/or an attachment tag. The value from the natural language input 102 may then be paired with one of the tags to form one of the tagged primitives 108.

Other primitives based on metadata of the communications may also be understood by the present technology and used as a primitive tags. For instance, metadata relating to categories of the communication may be included with the communication. Such categorization or topic may be generated by the composer of the communication (e.g., the user that generated or drafted the communication). In other examples, the categorization or topic may be generated by an automated analysis of the communication. For instance, the communication application and/or communication server may process incoming communications and add additional metadata or information to the incoming communication. The additional metadata, such as categorization or topic, may be generated through machine learning techniques that generate the metadata. In such examples, the communications may be analyzed by an ML model that is trained to generate the specific types of metadata from the incoming communications. Such metadata may be generated and stored with the communications when the communications are received. Accordingly, the primitive tags may also include a topic tag and/or a category tag. The categorization values may include categories such as newsletters, meeting responses, pull requests, etc. The topic values may include topics such as welcome or specific project names, among others.

In addition to categorization or topic metadata, the metadata or additional information may include urgency data and associated task data. The urgency data and/or associated tag data may be generated or added by the composer of the communication. In other examples, the urgency data and/or associated tag data may be automatically generated based on processing or analyzing the communication, which may be performed by an ML model in similar manner as generating the categorization and/or topic values. The urgency data may include values such as urgent, important, low priority, etc. The task data may include values such as a reply needed, approval, etc. Accordingly, the primitive tags may also include a task tag and/or an urgency tag.

The action 110 in the ML output 106 also has a value that is from the natural language input 102. The actions that may be recognized by the ML model 104 may include various actions that may be performed on communications. Some example actions 110 that may be tagged or identified by the ML model 104 include: a move action, a flag action, a mark-as-read action, a mark-as-unread action, a delete action, and/or a show action, among others.

In some examples, the value(s) for the tagged primitives 108 and/or the action 110 may be ambiguous, user-specific, or require further processing or resolution in order to be used within an automation rule. In such examples, a resolution database 112 may be queried to resolve the ambiguous or user-specific term. The resolution database 112 may include additional data that is specific to the user that is providing the natural language input 102. The resolution database 112 may store data relating to the user (and other users) based on tracking of usage or interactions of the user. For instance, the resolution database 112 may include a knowledge graph of data relating to the user.

As an example, the ML model 104 may generate a tagged primitive 108 with a value that is specific to the user that provided the natural language input 102. As a specific example, the tagged primitives 108 may include "From: Top People," where the primitive tag is "From" and the value is "Top People." The value of "top people" connotes a set of people with whom the user that provided the natural language input 102 most frequently interacts. To resolve the value "top people" into values that may be used to filter or identify specific communications, however, additional information is needed, such as the names or identities of the people that satisfy the "top people" for the user.

To retrieve the identities of the "top people," the resolution database 112 may be queried. The query may include the query term of "top people" along with the identity of the user that provided the natural language input 102. A query result is then returned with the identities of the top people for the user. The query result (e.g., the returned identities) may then be used to replace the value "top people" in the tagged primitive of "From: Top People." While "top people" is used as a specific example, other user-specific values that may be provided in the natural language input 102 or as a value of the tagged primitive 108 may include "my people," "my team," "my manager," etc. Such values may be resolved into specific identities of users in a similar manner as discussed above.

The ML output 106 is then provided to a rule generation engine 114. The rule generation engine 114 generates the automation rules for processing or taking actions on communications. To generate the automation rule(s), the rule generation engine 114 may access a plurality of rule templates 116. The rule templates 116 may include templates for automation rules, and each of the rule templates may be for a specific action. For instance, a first rule template may be for a first action and a second rule template may be for a second action. Thus, based on the identified action 110 in the ML output 106, the rule generation engine 114 selects a rule template from the rule templates 116 that corresponds to the identified action 110. The rule generation engine 114 then fills the selected rule template with the tagged primitives 108 to generate an automation rule 118, as discussed further below. The generated automation rule 118 may then be immediately executed or stored for later execution.

Each rule template may be composed of a plurality of slots that are filled with values in the ML output 106. In one example, the rule template includes an action slot, which may be prefilled for each template that is specific to the template. In other examples, a generic rule template may be used that includes a fillable action slot that is filled with the value for the action 110 in the ML output 106. The rule template may also include one or more filter slots that are filled with values of the corresponding tagged primitives 108. For instance, each of the filter slots may be labeled with a primitive tag that corresponds to an available output from the ML model 104. The filter slots are then filled with the corresponding values from the tagged primitives 108 in the ML output 106. As an example, a filter slot may include "from" filter slot (e.g., "Read: _____." A tagged primitive 108 of "Read: false" may be provided in the ML output 106 (indicating unread communications). Thus, the unfilled filter slot is filled to form a filled filter slot of "Read: false".

Each rule template may include a set of filter slots are specific or useful for the specified action of the rule template. In addition, the set of filter slots may be defined as required or optional. For instance, a minimum number of filter slots may be required in order to identify a set of communications for which the action is to be performed. Without at least one filter slot, it may not be possible to identify or filter the set of communications. In some examples, more than one filter slot may be required to perform the specified action. In examples where the minimum number of filter slots are not filled or fillable based on the tagged primitives 108 in the ML output 106, a prompt may be displayed by the communications application that prompts the user to fill in one or more of the required filter slots. Once filled by the user input, the automation rule 118 may be generated.

The generated automation rule 118 may then be immediately executed and/or stored for later execution. Executing the automation rule 118 may include a two-step process with a first step of filtering stored or available communications based on the filled filter slots of the automation rule 118 to generate a subset of communications that satisfy the filter criteria of the filled filter slots. The action specified in the automation rule 118 is then performed on the subset of communications.

The automation rule 118 may also be stored as a recurring rule that is executed on a recurring basis or upon new communications being received. For example, the automation rule 118 may be performed at a set interval, such as once per day, week, or other time interval. The recurring automation rule 118 may also be executed upon receiving new communications. For instance, if a new communication satisfies the filter criteria of the filled filter slots, the specified action is performed on the new communication.

Whether the automation rule 118 is stored as a recurring rule or not may also be determined from the natural language input 102. For instance, the ML output 106 may further include an output that indicates whether the automation rule 118 is to be a recurrent rule. Alternatively or in addition, a prompt may be displayed to the user that requests an input from the user to indicate whether the automation rule 118 should be stored as a recurrent rule.

In some examples, the automation rule 118 may also be displayed to the user to request confirmation of the automation rule 118 and/or edits to the automation rule 118. For instance, a user interface may be displayed that indicates the values for the filter slots as well as the identified action. The user may then be able to edit each of the fields and/or add additional filter fields or values. Once the edits are received, the edited automation rule 118 is stored and/or executed.

Figure 2:
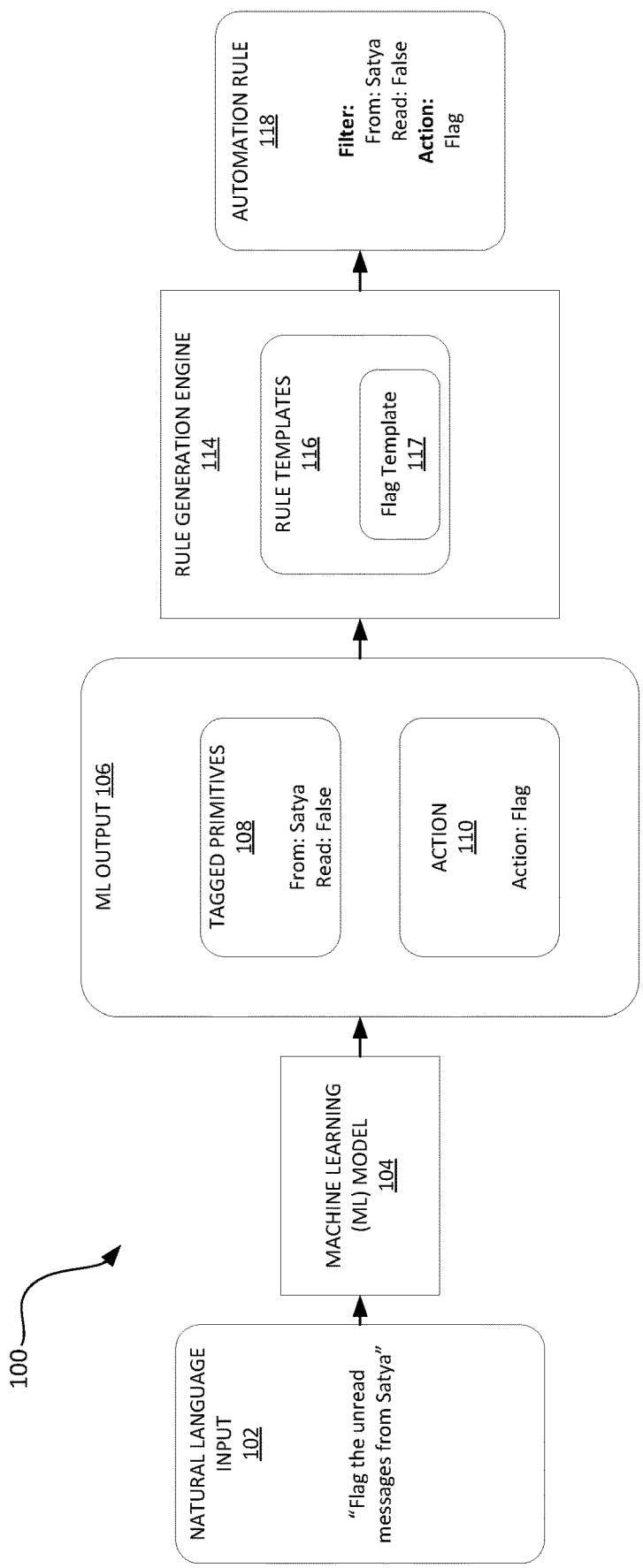
FIG. 2 depicts the example system of FIG. 1 for an example natural language input.

FIG. 2 depicts the example system 100 of FIG. 1 for an example natural language input 102. In the example depicted in FIG. 2, a natural language input 102 of "Flag the unread messages from Satya." The natural language input 102 is received a text input into a communication application. That natural language input 102 is provided as input into the ML model 104, which processes the natural language input 102 to produce the ML output 106. The ML output includes two tagged primitives 108. The first tagged primitive 108 is "From: Satya," and the second tagged primitive 108 is "Read: False." The action 110 in the ML output 106 is "Action: Flag," which indicates that the action to be performed is to flag the messages.

The ML output 106 is provided to the rule generation engine 114, where flag rule template 117 is selected from the rule templates 116 based on the flag action 110. The filter slots of the flag rule template are then filled with the tagged primitives 108 in the ML output 106 to generate the automation rule 118. The automation rule 118 includes the following filled filter slots "From: Satya; Read: False" and the action of "Action: Flag."

When the generated automation rule 118 is executed, the communications application filters the available messages to form a subset of messages that are from Satya and are unread. The subset of messages are then flagged, and the subset of messages are stored with their new flagged status.

Many other natural language inputs 102 may also be processed by the system 100 to generate automation rules. As another example, the received natural language input 102 may be "move only unread messages not from my manager that are flagged to Important folder." The ML output 106 for that natural language input 102 includes the tagged primitives 108 of "from: not my manager; flag: True; read: False." The ML output 106 includes the action 110 of "action: move to folder Important." Because the value "not my manager" is user-specific, the resolution database 112 is queried to identify the manager of the user that provided the natural language input 102. In this example, Brad Smith is returned by the resolution database 112 as the query result and the identification of the manager of the user. Accordingly, the resultant automation rule 118 includes the following filled filter slots: "from: not Brad Smith; flag: True; read: False." When the automation rule 118 is executed, a subset of messages is generated with messages that are not from Brad Smith, are flagged, and are read. That subset of messages is then moved to the folder titled "Important."

As another example, the natural language input 102 may be "Delete all unread messages sent from Yammer before 2022." The corresponding ML output 106 includes the tagged primitives 108 of "from: Yammer; read: False; date_span: <1/Jan/2022." The ML output 106 includes the action 110 of "delete."

Figure 3:
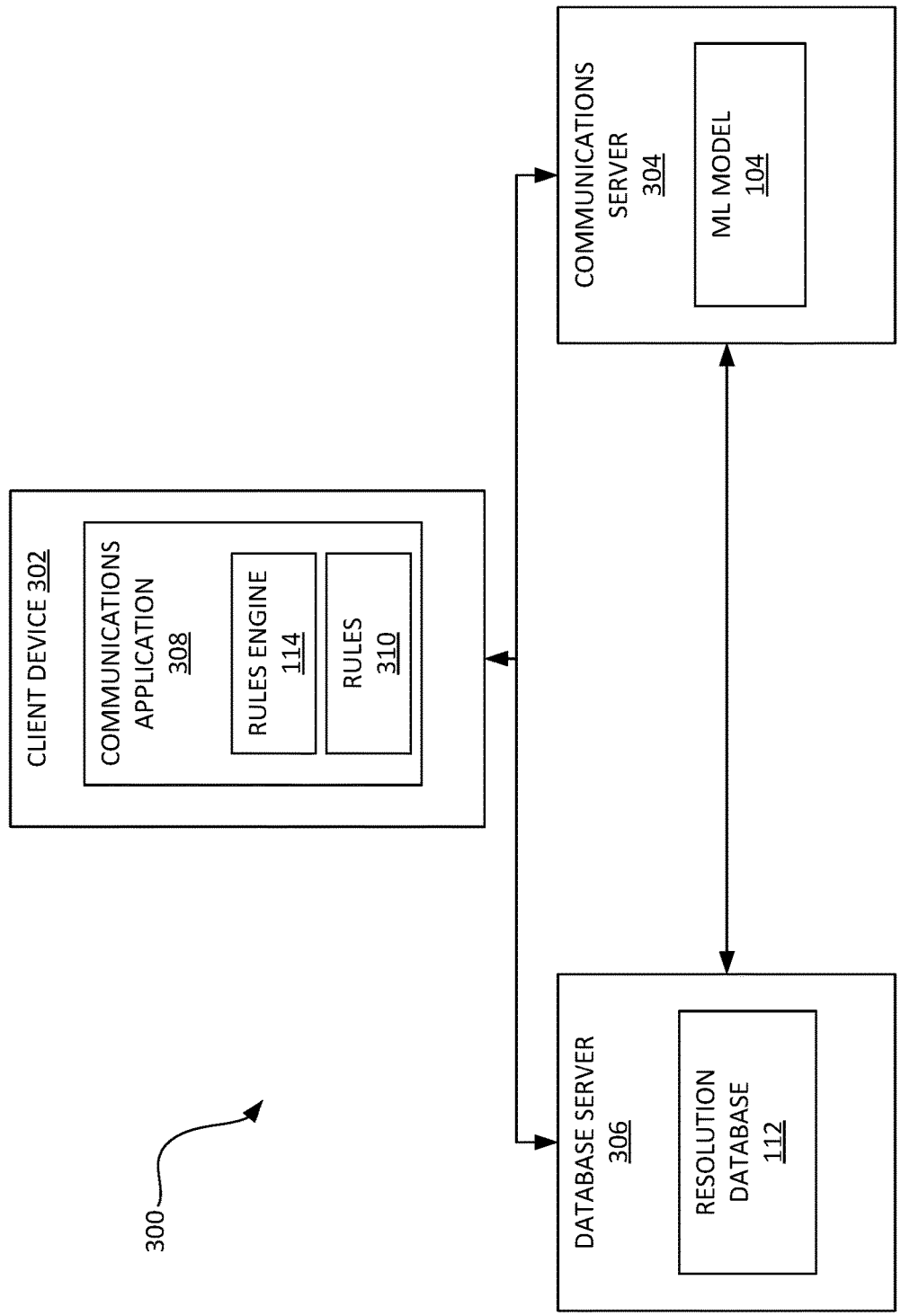
FIG. 3 depicts an example system for generating automation rules from natural language input.

FIG. 3 depicts an example system 300 for generating automation rules from natural language input. The system 300 includes a client device 302, a communications server 304, and a database server 306.

The client device 302 includes a communications application 308 installed on the client device 302. The client device 302 may be a mail application (e.g., Microsoft OUTLOOK mail application), messaging application, or other type of application that is capable of receiving communications, such as emails, messages (e.g., short message service (SMS) messages, text messages, chat messages, instant messages), or other types of communications. The communications application 308 receives the natural language inputs 102 from a user and displays the prompts and/or other user interfaces discussed herein. In the example depicted, the communications application 308 also includes the rule generation engine 114 and stores one or more automation rules 310.

The communications server 304 may store communication that are sent and received by the communications application 308. The communications server 304 may also include the ML model 104. Accordingly, in the example depicted, the natural language inputs 102 received by the communications application 308 at the client device 302 are transmitted from the client device 302 to the communications server 304 where the natural language inputs 102 are processed by the ML model 104. The ML output 106 from the ML model 104 is then transmitted from the communications server 304 to the client device 302 where the rule generation engine 114 uses the ML output 106 to generate a new automation rule 118 that is stored with the automation rules 310 of the communications application 308.

In some examples, as discussed above, the values in the tagged primitives 108 may be user-specific values or otherwise in need of further resolution to specific entities. In such examples, the resolution database 112 may be queried to resolve the entities of the user-specific values. The resolution database 112 may reside on a database server 306 that is separate from the communications server 304 and the client device 302.

The database server 306 may provide storage and/or application services for multiple applications and capture user data from interactions with a plurality of applications. As a result, rich data about the user may be available from the resolution database 112 in the database server 306. In one example, the resolution database 112 includes a graph database with nodes of different users and connections between the nodes representing connections between the users. The resolution database 112 may also alternatively or additionally include organization chart data that indicates hierarchy, groups, teams, etc. within an organization.

The query to the resolution database 112 to resolve the value of the tagged primitive 108 may be generated and transmitted from either the client device 302 and/or the communications server 304. For example, the communications server 304 may analyze the values of the tagged primitives 108 and determine whether further resolution from the resolution database 112 is necessary. In other examples, the client device 302 or rule generation engine 114 may make such a determination during the rule-generation process.

While the communications application 308, rule generation engine 114, and automation rules 310 are shown as being located on the client device 302 in the example depicted, in other examples, the communications application 308, rule generation engine 114, and/or the automation rules 310 may be resident on the communications server 304. For instance, where the communications application 308 is a cloud-based or web-based application, the communications application 308 and respective components may be stored on the communications server 304. The client device 302 may then access the communications application 308 from a web browser or other application for accessing web-based resources and applications.

Similarly, while the ML model 104 is depicted as being stored and executed on the communications server 304, in other examples, the ML model 104 may be stored and executed on the client device 302. In such examples, the ML model 104 may be trained remotely from the client device 302, such as on the communications server 304. The trained ML model 104 may then be transmitted to the client device 302 for local execution on the client device 302.

Figure 4A:
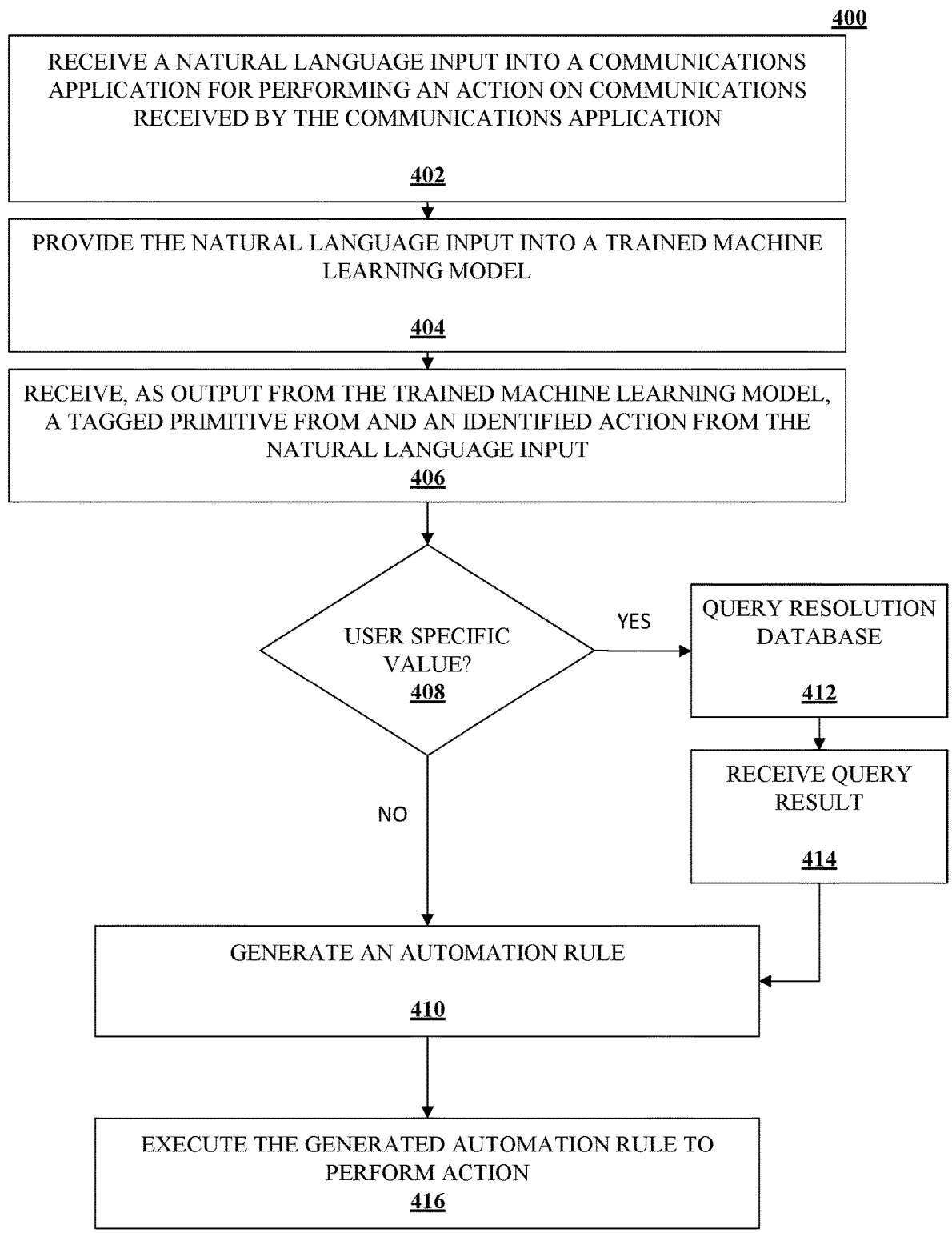
FIG. 4A depicts a flowchart of an example method for generating automation rules for processing communications.

FIG. 4A depicts a flowchart of an example method for generating automation rules for processing communications. One or more of the operations of method 400 may be performed by a client device (e.g., client device 302), a communications server (e.g., communications server 304), and/or a database server (e.g., database server 306).

At operation 402, a natural language input is received into a communications application. The natural language input relates to performing an action on communications received or stored by the communications application. At operation 404, the natural language input is provided into a trained ML model. Additional discussion of training the machine learning model is provided below with respect to FIG. 4C.

The trained ML model processes the received natural language input and generates an ML output that includes at least one tagged primitive and an identified action from the natural language input. That ML output is received in operation 406.

At decision operation 408, a determination is made as to whether one or more of the values in the ML output is user-specific or requires additional resolution. For instance, a determination may be made as to whether a value of one of the tagged primitives is user-specific. The determination may be made based on comparing the values of the tagged primitives or actions to a known list or set of a user-specific terms or known terms that require additional resolution. The known set of terms may be based on terms that are resolvable by the resolution database. Alternatively or additionally, the known set of terms may be based on terms that are frequently provided in natural language queries that require additional resolution.

If the values of the ML output are not user specific or require further resolution, the method 400 flows to operation 410 where an automation rule is generated with the values in the ML output. If the values of the ML output are determined to be user specific or require further resolution, the method 400 flows to operation 412 where a resolution database is queried. Querying the resolution database may include generating a query with the values identified as being user-specific or requiring further resolution. The query may also include an identification of the user that issued the natural language input. At operation 414, a query result is received in response to the query transmitted or executed against the resolution database. The method 400 then flows to operation 410 where the automation rule is generated based on at least the query result received in operation 414.

The automation rule that is generated in operation 410 is for performing the action in the ML output. For instance, the automation rule is for performing the action on a subset of communications received or stored by the communications application, where the subset of communications corresponding to the tagged primitives. Forming the automation rule may include, based on the identified action in the ML output, identifying a rule template from a plurality of rule templates. The identified rule template may include one or more predefined slots for the tagged primitives received in the ML output. The predefined filter slots are then filled with the values of the tagged primitives to form the automation rule.

In some examples, the generated automation rule may be displayed in a user interface to a user to allow for the user to confirm or edit the generated automation rule. For example, the system may received edits to one or more values that is provided within the rule. The edited rule may then be executed or stored.

At operation 416, the generated automation rule is executed to perform the action in the automation rule. Executing the automation rule may include first filtering communications that are stored or received by the communications application according to the values of the predefined filter slots (e.g., the values of the tagged primitives) to generate a subset of communications. The action in the automation rule is then performed on the subset of communications. In some examples, the generated automation rule may also be stored as a recurrent rule that is executed against newly incoming communications.

Figure 4B:
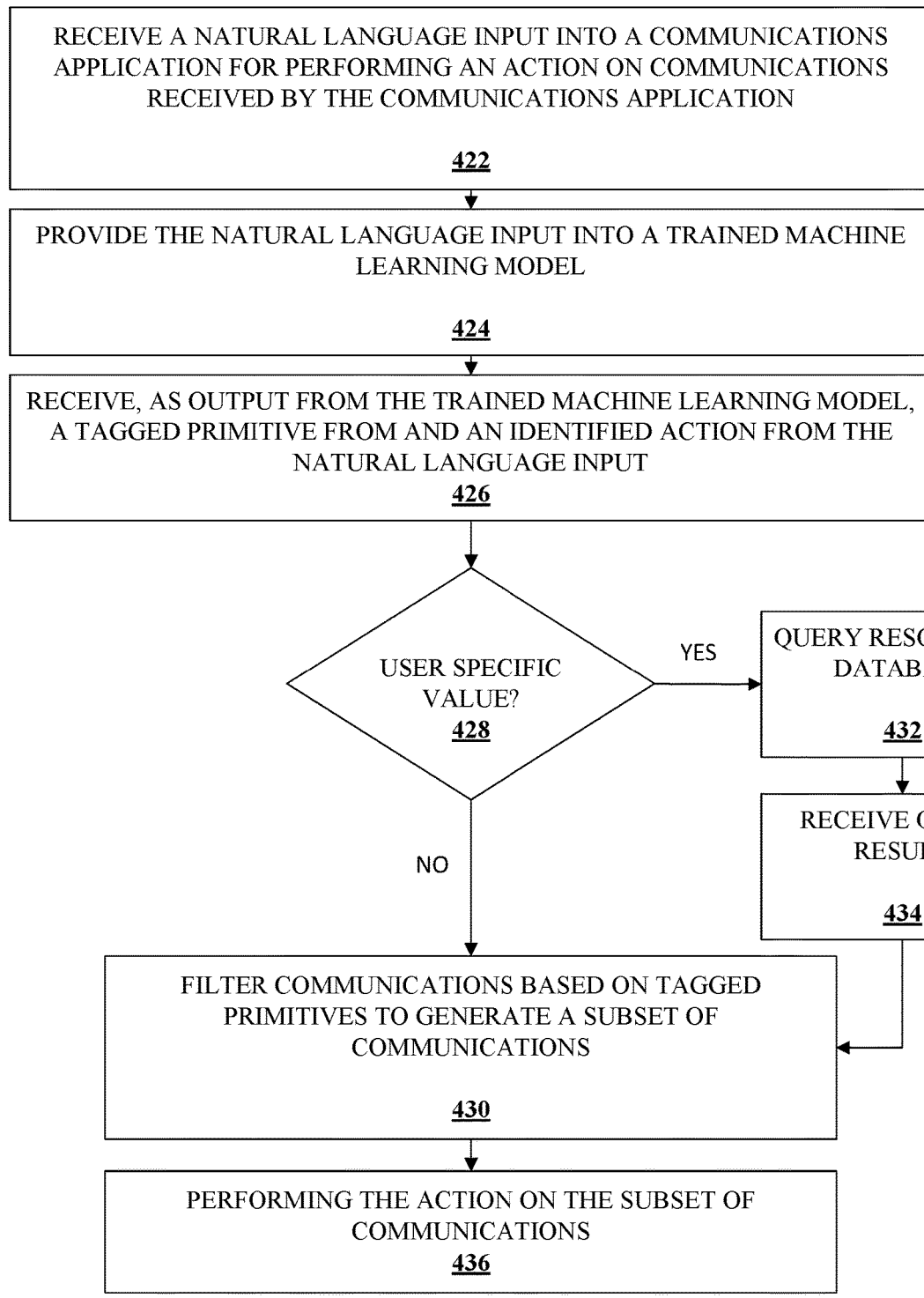
FIG. 4B is a flowchart of another example process.

FIG. 4B depicts a flowchart of another example method 420 for performing actions on communications based on natural language input. Operations 422-428 and operations 432 and 434 are the same operations as set forth in method 400 depicted in FIG. 4A. At operation 430, however, the method 420 differs from the method 400.

At operation 430, communications are filtered based on one or more values of tagged primitives. The values of the tagged primitives may be received in the ML output or corresponding resolved values received in the query result in operation 434. Filtering the communications results in a filtered subset of communications that have properties matching the values of the tagged primitives. At operation 436, the action identified in the ML output is performed on the filtered subset of communications.

Figure 4C:
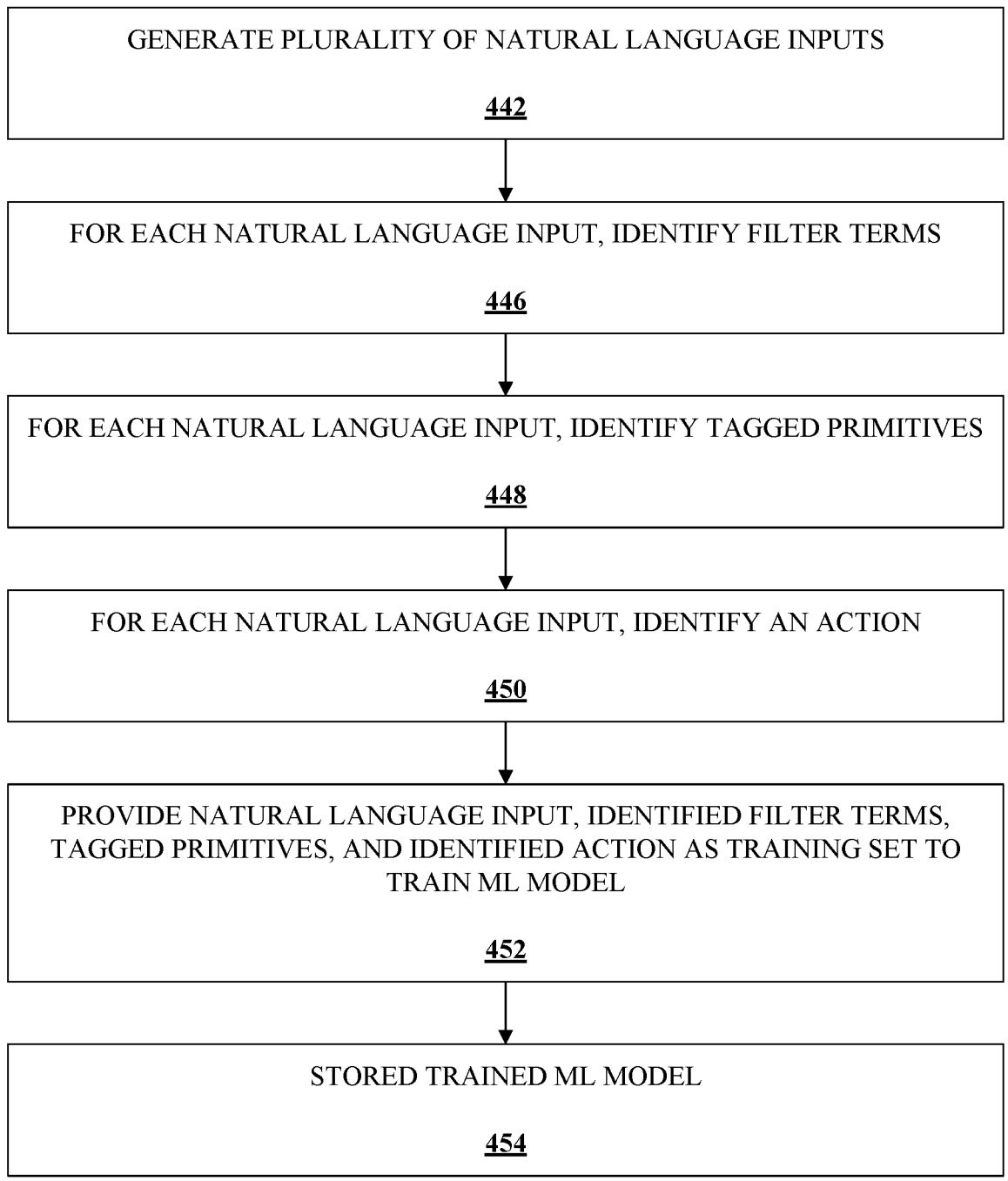
FIG. 4C is a flowchart of another example process.

FIG. 4C depicts a flowchart of an example method 440 for training an ML model. The training of the ML model in the method 440 is performed as a supervised training of the ML model. The method 440 may be performed by a server, such as the communication server. At operation 442, a plurality of natural language inputs are generated. The natural language inputs may be generated from previously received natural language inputs and/or generated artificially through manual or automated generation techniques.

At operations 446, for each natural language input, a filter phrase or filter terms may be identified. As an example, a natural language input may be "move to Focused only the messages not from my manager that are unread." The filter terms for that natural language input is "filter: not from my manager and unread." The filter terms may be manually identified or through other automation techniques to identify likely filter terms.

At operation 448, for each natural language input in the plurality of natural language inputs, tagged primitives are identified. Continuing with the natural language input above, the tagged primitives are "from: not my manager; read: False." At operation 450, for each natural language input in the plurality of natural language inputs, the action is identified. Continuing with the example above, the action is "action: move to Focused." The tagged primitives and action may be manually identified or through other automation techniques to identify likely tagged primitives and action terms.

Based on the identified filter terms, tagged primitives, and action, known input-output pairs a generated for the supervised training of the ML model. For example, the input of the input-output pair is a natural language input and the output of the input-output pair is the identified filter terms, tagged primitives, and action. An input-output pair is generated for each of the natural language inputs in the plurality of natural language inputs. The input-output pairs are provided as the training set to train the ML model in operation 452. Once the ML model is trained based on the training set of the input-output pairs, the ML model is saved or stored in operation 454. The trained ML model may then be used to generate the outputs as discussed above, such as in methods 400 and 420.

Figure 5:
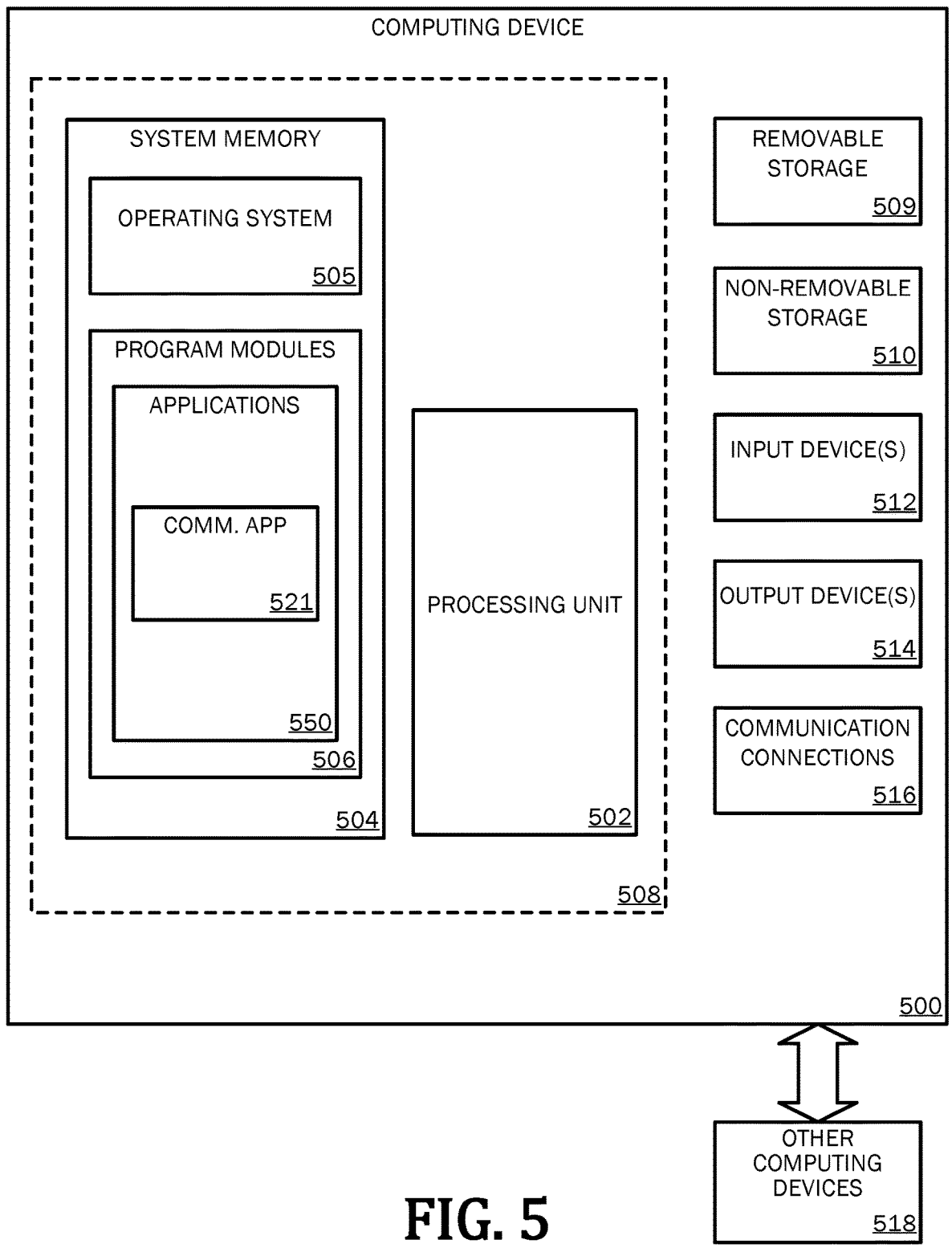
FIG. 5 is a block diagram illustrating example physical components of a computing device with which aspects of the technology may be practiced.

FIG. 5 is a block diagram illustrating physical components (i.e., hardware) of a computing device 500 with which examples of the present disclosure may be practiced. The computing device components described below may be suitable for a client device running the web browser discussed above. In a basic configuration, the computing device 500 may include at least one processing unit 502 and a system memory 504. The processing unit(s) (e.g., processors) may be referred to as a processing system. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running software applications 550 such as a communication application 521. For instance, the memory 504 may include instructions that when executed by the processor(s), causes the system or computing device 500 to perform the operations discussed herein.

The operating system 505, for example, may be suitable for controlling the operation of the computing device 500. Furthermore, aspects of the invention may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 may perform processes including, but not limited to, one or more of the operations of the methods illustrated in FIGS. 3-4. Other program modules that may be used in accordance with examples of the present invention and may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to generating suggested queries, may be operated via application-specific logic integrated with other components of the computing device 500 on the single integrated circuit (chip). Examples of the present disclosure may also be practiced using other technologies capable of performing logical operations such as, for example, AND, OR, and NOT, including but not limited to mechanical, optical, fluidic, and quantum technologies.

The computing device 500 may also have one or more input device(s) 512 such as a keyboard, a mouse, a pen, a sound input device, a touch input device, etc. The output device(s) 514 such as a display, speakers, a printer, etc. may also be included. The aforementioned devices are examples and others may be used. The computing device 500 may include one or more communication connections 516 allowing communications with other computing devices 518. Examples of suitable communication connections 516 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
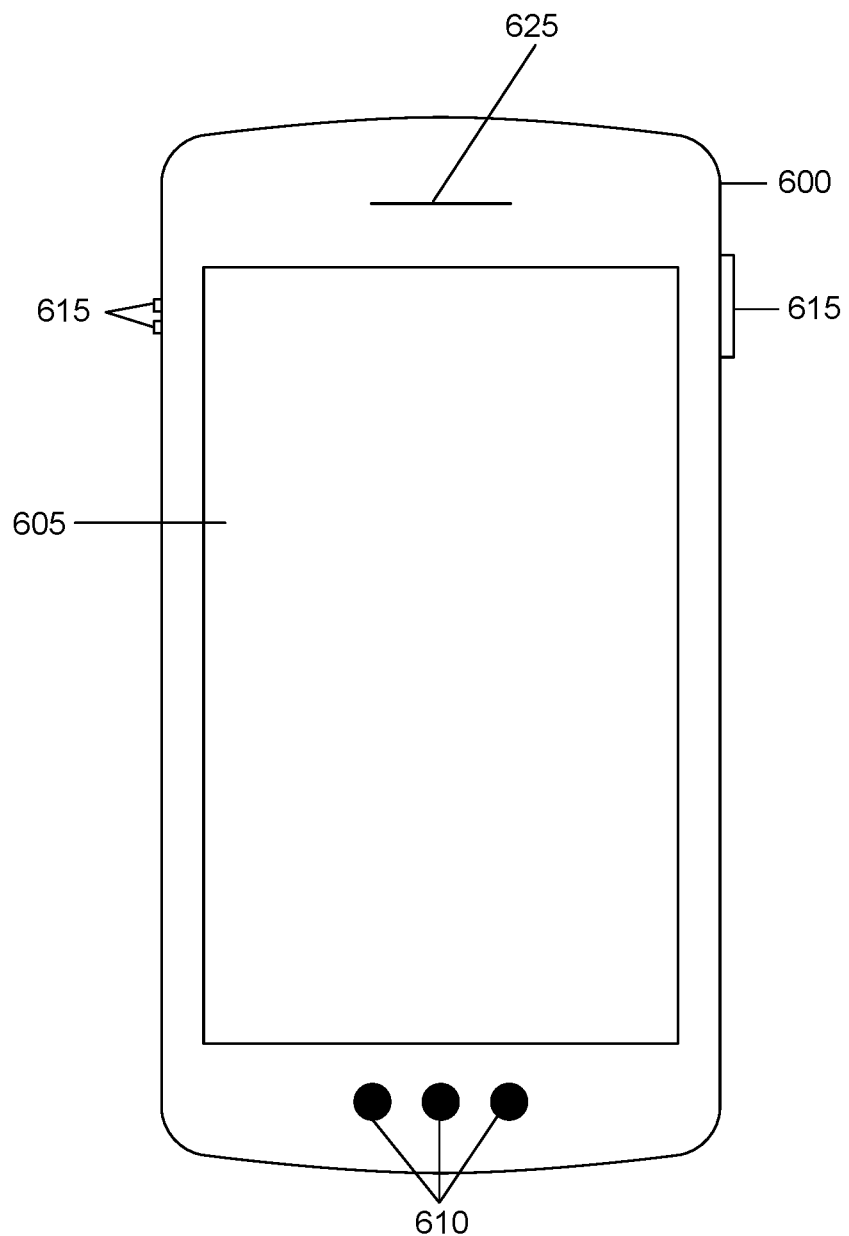
FIGS. 6A and 6B are simplified block diagrams of a mobile computing device with which aspects of the present technology may be practiced.
Figure 6B:
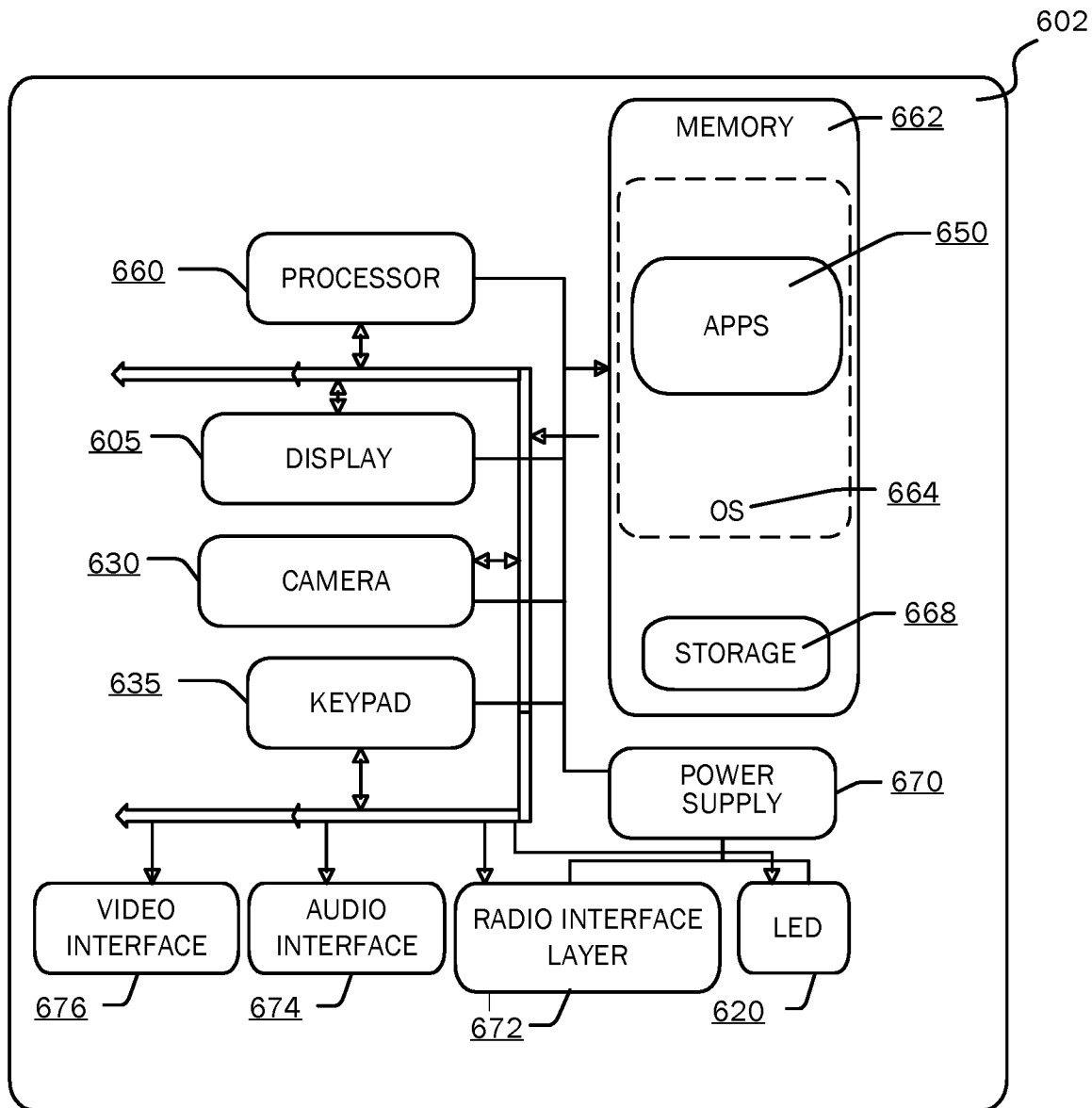

FIGS. 6A and 6B illustrate a mobile computing device 600, for example, a mobile telephone, a smart phone, a tablet personal computer, a laptop computer, and the like, with which aspects of the invention may be practiced. With reference to FIG. 6A, an example of a mobile computing device 600 for implementing at least some aspects of the present technology is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, optional side input elements 615 allows further user input. The side input elements 615 may include buttons, switches, or any other type of manual input elements. In alternative examples, mobile computing device 600 may incorporate more or less input elements. Key input may generally be received from a soft keyboard displayed on the display 605, but in other examples, the mobile computing device 600 may also include an optional physical keypad. Optional keypad 635 may be a physical keypad or a "soft" keypad generated on the touch screen display. One or more audio transducers 625 (e.g., speakers) may also be included. In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and/or a video output for sending signals to or receiving signals from an external device.

FIG. 6B is a block diagram illustrating the architecture of one example of a mobile computing device. That is, the mobile computing device 600 can incorporate a system (i.e., an architecture) 602 to implement some examples. In one example, the system 602 is implemented as a "smart phone" capable of running one or more applications (e.g., videoconference or virtual meeting application, web browser, e-mail, calendaring, contact managers, messaging clients, games, and media clients/players). In some examples, the system 602 is integrated as a computing device, such as an integrated personal digital assistant (PDA) or wireless phone.

One or more application programs 650 may be loaded into the memory 662 and run on or in association with the operating system 664. Examples of the application programs include videoconference or virtual meeting programs, phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 650 may use and store information in the non-volatile storage area 668, such as e-mail or other messages used by an e-mail application, and the like. A synchronization application (not shown) may also reside on the system 602 and is programmed to interact with a corresponding synchronization application resident on a host computer to keep the information stored in the non-volatile storage area 668 synchronized with corresponding information stored at a remote device or server. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

The visual indicator 620 may be used to provide visual notifications and/or an audio interface 674 may be used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to data/information transfer and storage means, including electronic mail and collaborative data/information sharing systems.

As should be appreciated from the foregoing, in an aspect, the technology relates to a computer-implemented method that includes receiving natural language input, into a communications application, for performing an action on communications received by the communications application. The computer-implemented method may also include providing the natural language input to a trained machine learning model. The method may furthermore include receiving, as output from the trained machine learning model, a tagged primitive and an identified action from the natural language input. The method may in addition include generating an automation rule for performing the action on a subset of communications received by the communications application, the subset of communications corresponding to the tagged primitives. The method may moreover include executing the generated automation rule to perform the action on the subset of communications.

The described implementations may also include one or more of the following features. The method where generating the automation rule may include: based on the identified action, identifying a rule template from a plurality of rule templates, the identified rule template having a predefined filter slot for the tagged primitive; and filling the filter slot of the identified rule template with the tagged primitive. The method may include: causing a display of the generated automation rule; receiving an edit to the automation rule; and storing the edited automation rule as a recurrent automation rule. The method where the tagged primitive includes an entity from the natural language input and a primitive tag. The method where the primitive tag is one of a to tag, a from tag, an invite tag, an update tag, a read tag, a flag tag, a date-span tag, or a folder tag. The method where the action is one of a move action, a flag action, a mark-as-read action, a mark-as-unread action, a delete action, or a show action. The method may include: based on a value of the tagged primitive, querying a remote database to resolve the value of the tagged primitive; receiving a result to the query; and where generating the automation rule includes using the result to the query. Implementations of the described techniques may include hardware, a method or process, or a computer tangible medium.

In another aspect, the technology relates to a system that includes a processor and memory storing instructions that, when executed by the processor, are configured to cause the system to perform operations. The operations include receive a natural language input to a communications application for performing an action on communications stored by the communications application; provide the natural language input into a trained machine learning model; receive, as output from the trained machine learning model, tagged primitives and an identified action from the natural language input; generate an automation rule for performing the action on a subset of communications received by the communications application, the subset of communications corresponding to the tagged primitives; execute the generated automation rule to perform the action on the subset of communications; store the generated automation rule as a recurring rule; receive a new communication; and execute the recurring rule to perform the action on the new communication.

The described implementations may also include one or more of the following features. The system where generating the automation rule may include: based on the identified action, identifying a rule template from a plurality of rule templates, the identified rule template having one or more predefined filter slots for the tagged primitives; and filling the filter slots of the identified rule template with the tagged primitives. The system where the operations further may include: cause a display of the generated automation rule receive an edit to the automation rule; and store the edited automation rule as a recurrent automation rule. The system where each of the tagged primitives includes an entity from the natural language input and a primitive tag. The system where the primitive tags include at least one of a topic tag, a category tag, a task tag, or an urgency tag. The system where the action is one of a move action, a flag action, a mark-as-read action, a mark-as-unread action, a delete action, or a show action. The system may include: based on a value of at least one of the tagged primitives, querying a remote database to resolve the value of the tagged primitive; receiving a result to the query; and where generating the automation rule includes using the result to the query.

In another aspect, the technology relates to a computer-implemented method that includes receiving a natural language input into a communications application for performing an action on communications received by the communications application. The computer-implemented method may also include providing the natural language input into a trained machine learning model. The method may furthermore include receiving, as output from the trained machine learning model, a tagged primitive and an identified action from the natural language input. The method may in addition include filtering communications based on the tagged primitive to generate a filtered set of communications. The method may moreover include performing the action on the filtered set of communications.

The described implementations may also include one or more of the following features. The method may include generating an automation rule for performing the action based on the tagged primitive. The method where generating the automation rule may include: based on the identified action, identifying a rule template from a plurality of rule templates, the identified rule template having one or more predefined filter slots. The method may include filling one or more of the filter slots of the identified rule template with the tagged primitive to generate an automation rule. The method may include: based on a value of the tagged primitive, querying a remote database to resolve the value of the tagged primitive; receiving a result to the query; and filling one or more of the filter slots with the received result to the query to generate an automation rule. The method may include: storing the automation rule as a recurring rule; receiving a new communication; and based on the new communication satisfying a value of the one or more filter slots, performing the action on the new communication.

The foregoing disclosure provides illustration and description but is not intended to be exhaustive or to limit the implementations to the precise form disclosed. Modifications may be made in light of the above disclosure or may be acquired from practice of the implementations. As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein. As used herein, satisfying a threshold may, depending on the context, refer to a value being greater than the threshold, greater than or equal to the threshold, less than the threshold, less than or equal to the threshold, equal to the threshold, and/or the like, depending on the context. Although particular combinations of features are recited in the claims and/or disclosed in the specification, these combinations are not intended to limit the disclosure of various implementations. In fact, many of these features may be combined in ways not specifically recited in the claims and/or disclosed in the specification.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more examples provided in this application are not intended to limit or restrict the scope of the invention as claimed in any way. The aspects, examples, and details provided in this application are considered sufficient to convey possession and enable others to make and use the best mode of claimed invention. The claimed invention should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the claimed invention.

Although each dependent claim listed below may directly depend on only one claim, the disclosure of various implementations includes each dependent claim in combination with every other claim in the claim set. No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A computer-implemented method, the method comprising:
    receiving a natural language input, into an email application, for performing an action on emails received by the email application;
    providing the natural language input to a trained machine learning model;
    receiving, as output from the trained machine learning model, a tagged primitive and an identified action from the natural language input;
    generating an automation rule for performing the action on a subset of emails previously received by the email application, the subset of emails corresponding to the tagged primitives, wherein generating the automation rule comprises:
        based on the identified action, identifying a rule template from a plurality of rule templates available from the email application, the identified rule template having a predefined filter slot for the tagged primitive; and
        filling the filter slot of the identified rule template with the tagged primitive; and
    executing the generated automation rule to perform the action on the subset of emails.

2. The method of claim 1, further comprising:
    causing a display of the generated automation rule;
    receiving an edit to the automation rule; and
    storing the edited automation rule as a recurrent automation rule.

3. The method of claim 1, wherein the tagged primitive includes an entity from the natural language input and a primitive tag.

4. The method of claim 3, wherein the primitive tag is one of a to tag, a from tag, an invite tag, an update tag, a read tag, a flag tag, a date-span tag, or a folder tag.

5. The method of claim 1, wherein the action is one of a move action, a flag action, a mark-as-read action, a mark-as-unread action, a delete action, or a show action.

6. The method of claim 1, further comprising:
    based on a value of the tagged primitive, querying a remote database to resolve the value of the tagged primitive;
    receiving a result to the query; and
    wherein generating the automation rule includes using the result to the query.

7. A system for generating email automation rules, comprising:
    a processor; and
    memory storing instructions that, when executed by the processor, are configured to cause the system to perform operations comprising:
        receive a natural language input to an email application for performing an action on emails stored by the email application;
        provide the natural language input into a trained machine learning model;
        receive, as output from the trained machine learning model, tagged primitives and an identified action from the natural language input;
        generate an automation rule for performing the action on a subset of previously received emails received by the email application, the subset of emails corresponding to the tagged primitives, wherein generating the automation rule comprises:
            based on the identified action, identifying a rule template from a plurality of rule templates, the identified rule template having one or more predefined filter slots for the tagged primitives; and
            filling the filter slots of the identified rule template with the tagged primitives;
        execute the generated automation rule to perform the action on the subset of emails;
        store the generated automation rule as a recurring rule;
        receive a new email; and
        execute the recurring rule to perform the action on the new email.

8. The system of claim 7, wherein the operations further comprise:
    cause a display of the generated automation rule;
    receive an edit to the automation rule; and
    store the edited automation rule as a recurrent automation rule.

9. The system of claim 7, wherein each of the tagged primitives includes an entity from the natural language input and a primitive tag.

10. The system of claim 9, wherein the primitive tags include at least one of a topic tag, a category tag, a task tag, or an urgency tag.

11. The system of claim 7, wherein the action is one of a move action, a flag action, a mark-as-read action, a mark-as-unread action, a delete action, or a show action.

12. The system of claim 7, further comprising:
    based on a value of at least one of the tagged primitives, querying a remote database to resolve the value of the tagged primitive;
    receiving a result to the query; and
    wherein generating the automation rule includes using the result to the query.

13. A computer-implemented method for generating email automation rules, the method comprising:

receiving, by an email application, a natural language input for performing an action on emails received by the email application;

providing the natural language input into a trained machine learning model;

receiving, as output from the trained machine learning model, a tagged email primitive and an identified action from the natural language input;

generating an automation rule by identifying a rule template based on the identified action and filling filter slots of the identified rule template with the tagged email primitive;

executing the generated automation rule, wherein executing the generated automation rule causes:

filtering the emails received by the email application based on the tagged primitive to generate a filtered set of emails;

performing the action on the filtered set of emails.

14. The method of claim 13, further comprising:

based on a value of the tagged primitive, querying a remote database to resolve the value of the tagged primitive;

receiving a result to the query; and filling one or more of the filter slots with the received result to the query to generate the automation rule.

15. The method of claim 14, further comprising:

storing the automation rule as a recurring rule;

receiving a new email; and based on the new email satisfying a value of the one or more filter slots, performing the action on the new email.

* * * * *